July 23, 1957     S. J. KABLICK ET AL     2,800,373
SELF-LUBRICATING BEARING
Filed April 14, 1953     2 Sheets-Sheet 1
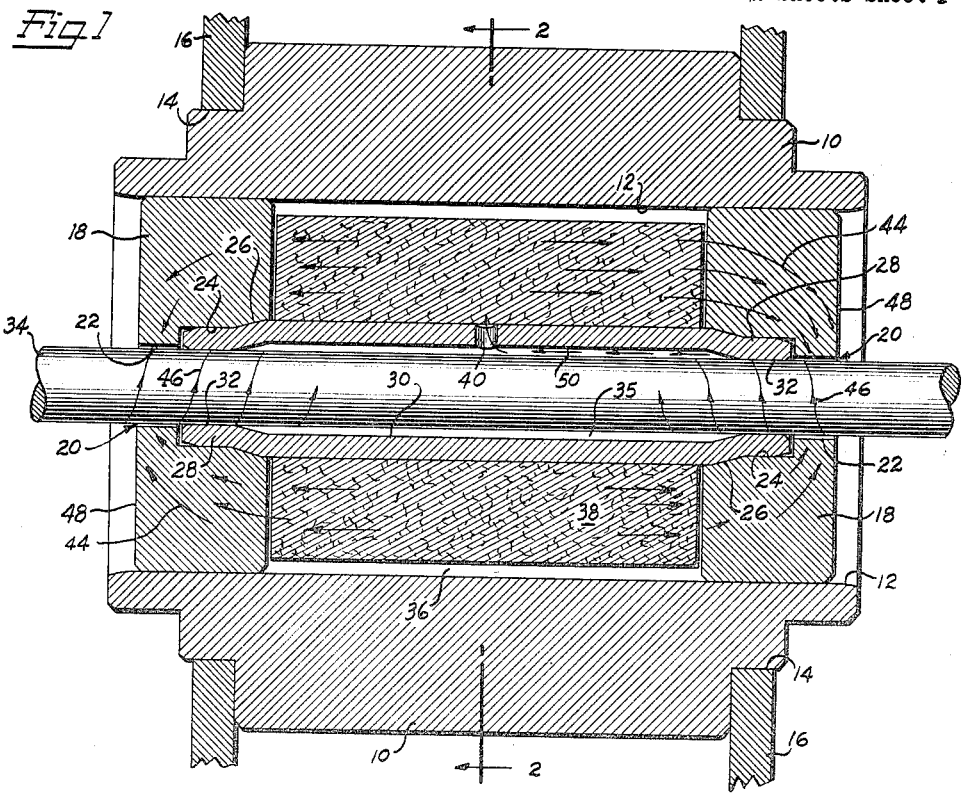
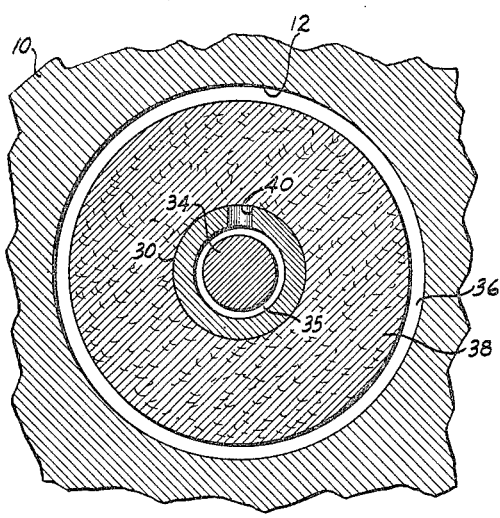
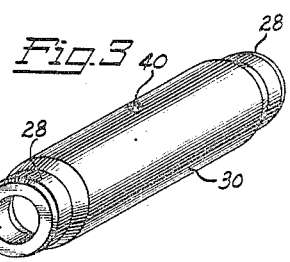
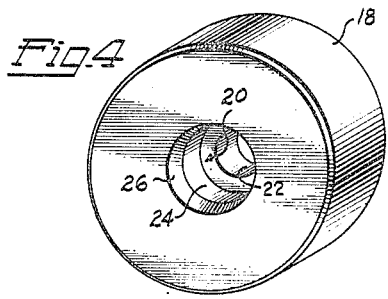
Inventors
Stanley J. Kablick
and Earl D. Brightman
by Steward & Spruegel
Attorneys.

July 23, 1957  S. J. KABLICK ET AL  2,800,373
SELF-LUBRICATING BEARING
Filed April 14, 1953  2 Sheets-Sheet 2

Inventors
Stanley J. Kablick
and Earl D. Brightman
by Steward & Spruegel
Attorneys.

United States Patent Office 2,800,373
Patented July 23, 1957

2,800,373
SELF-LUBRICATING BEARING

Stanley J. Kablick, Unionville, and Earl D. Brightman, Bristol, Conn., assignors to The Sessions Clock Company, Forestville, Conn., a corporation of Connecticut Application April 14, 1953, Serial No. 348,766

11 Claims. (Cl. 308—121)

This invention relates to improvements in bearings and bearing lubrication devices, and it has particular reference to a novel self-lubricating bearing unit adapted to provide continuous bearing surface lubrication over an extended period of time.

In certain bearing applications, as for example in miniature electric motors used in clocks or other timing devices, it is desirable that there be some internal means to ensure continuous lubrication of the bearing surfaces so that the motor or other device can operate satisfactorily over long periods of time without attention. Heretofore it has been found that the best approach to obtaining such operation is to provide the bearings with a store of lubricant arranged to feed slowly to the bearing surfaces so that the lubrication of these surfaces will continue for an extended period. In most of these lubrication arrangements, however, difficulty has been encountered in controlling the rate of feed and direction of travel of the lubricant. For example, in many devices of the prior art, the stored lubricant works its way out of the storage space too rapidly and, in addition to moving to the bearing surfaces, travels to places where it is neither needed or desired. This causes the supply to be exhausted in a short time so that the bearing surfaces run dry. Other designs, in attempting to overcome the difficulty just referred to, have resulted in the stored lubricant remaining in storage, so that an insufficient amount of lubricant reaches the bearing surfaces. The net effect of this latter difficulty, of course, is the same as if the lubricant supply were exhausted.

An arrangement devised heretofore for providing continuous feed of a stored lubricant over an extended period of time is disclosed in the Fritz patent, #2,317,902, issued April 27, 1943. The Fritz device provides an air vent which prevents the creation of a vacuum in the storage space so that the lubricant is permitted continuous flow to the bearings. In many of the prior art devices, it is the creation of a vacuum or partial vacuum, after some of the lubricant has passed from the storage area, which prohibits further passage of the lubricant to the bearing surfaces.

The self-lubricating bearing unit of the present invention is an improvement over the Fritz device and comprises novel lubricant distributor means for closely controlling the rate of feed and path of a lubricant from a storage chamber to the bearing surfaces, and an improved bearing structure incorporating all of the bearing surfaces in a single unitary element. Unlike the Fritz device, the bearing element and lubrication distributor of the present construction are distinct and separable components although there is a definite coaction therebetween. The separation of these components, as well as the novel construction of each, results in greatly improved control over the lubricant feed and in improved over-all performance and efficiency of the entire self-lubricating bearing unit. These improvements in turn ensure continuous lubrication of the bearing surfaces over extended periods of time as will be more fully explained hereinafter.

In the novel bearing lubricating arrangement here proposed, the lubricant distributor means do not form the bearings for the shaft and, therefore, do not have bearing or running fit with it. Thus the distributors are arranged so that they have a larger clearance with the shaft than the clearance provided in the bearings. The distributor clearance is, however, not so large as to destroy the flow of lubricant from the distributor to the shaft. Since the distributors are disposed adjacent the outer ends of the bearing surfaces, lubricant deposited on the shaft by the distributors works its way into the bearings to maintain the proper lubricating film in the bearing. Moreover, when the motor or other device in which the bearings are assembled is started up from rest, the temperature rise occasioned thereby causes an expansion of the lubricant in the storage chamber and along the path by which it travels to the bearings. This expansion tends to force the lubricant out of the bearings and has, in previous bearing arrangements, been a primary factor causing end-leakage of the lubricant. An important advantage of the present bearing unit stems from the fact that the distributor blocks, being made of porous material and having a greater clearance with the shaft than the bearing surfaces, tend to hold the lubricant in the system and therefore to sharply decrease the loss of lubricant through end-leakage.

A primary object of the present invention, therefore, is to provide a novel self-lubricating bearing unit which will permit continuous bearing surface lubrication for longer periods of time than have been possible heretofore, and at the same time ensure smooth and efficient operation of the unit as a whole.

Another important object of the invention is to provide an improved bearing element which will permit sustained rotation of the supported shaft with a minimum of noise and wear.

A further important object of the invention is to provide a novel self-lubricating bearing by means of which controlled amounts of a stored lubricant will be fed along a predetermined path to the bearing surfaces over an extended period of time.

A more specific object of the invention is to provide an improved motor shaft bearing structure comprising a single, unitary member which will permit very accurate bearing alignment and thereby reduce shaft and bearing wear through the maintenance of proper film thickness of the lubricant.

Another specific object of the invention is to provide a novel motor lubrication system which, by selection of lubrication system components having the proper balance of characteristics, will ensure sustained lubrication of the motor bearing surfaces for any predetermined temperature and load condition in the motor.

The following detailed description taken in conjunction with the accompanying drawings discloses one typical embodiment of the novel self-lubricating bearing unit as well as the novel method of assembling it. As will be apparent to those skilled in the art, various changes may be made in the disclosed embodiment without in any way departing from the concept of the invention.

In the drawings:

Fig. 1 is a side elevation in section of a portion of a motor incorporating a typical embodiment of the novel bearing unit;

Fig. 2 is a transverse section through the motor taken along line 2—2 of Fig. 1;

Fig. 3 is a perspective view of the bearing element of Fig. 1;

Fig. 4 is a perspective view of one of the lubricant distributor elements of Fig. 1;

Figure 5:
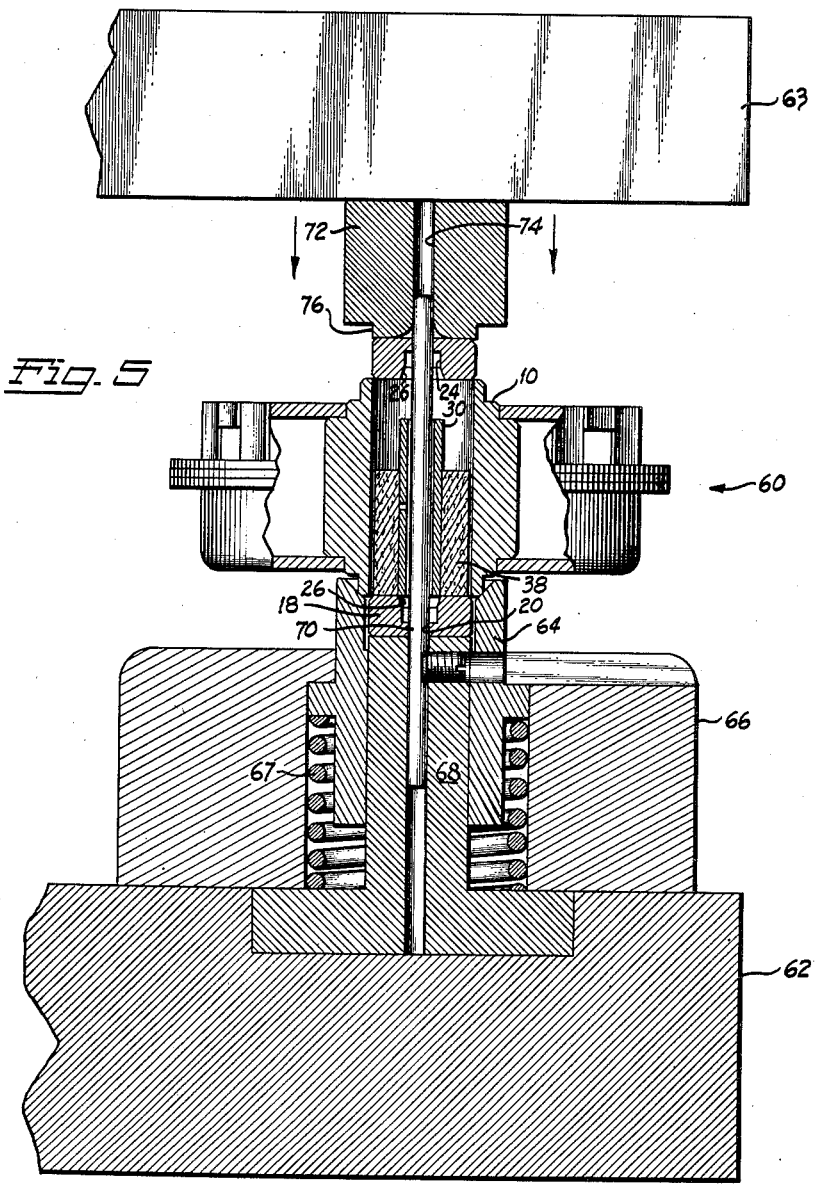
Fig. 5 is a more or less diagrammatic view of apparatus for assembling the bearing unit in an electric motor and showing the various parts of the bearing in position for final assembly.

Figs. 1 to 4 of the drawings show one embodiment of the novel bearing unit, which was designed in this particular case, for an electric motor of the type used in electric clocks. Since the motor itself is conventional, only enough is shown to illustrate the relation of the invention thereto. The portion of the motor shown includes a core 10 formed of soft iron or the like having a central passage 12 extending longitudinally therethrough. Core 10 is formed with a shoulder 14 adjacent each end, and a pole piece 16 is rigidly mounted on each shoulder.

A pair of annular lubricant distributor blocks 18 are tightly fitted or pressed into the central passage 12 of core 10 so as to be spaced from one another as shown. These blocks are formed of a porous material such as sintered metal or the like which will permit the passage of a lubricant therethrough in a manner to be explained. A central passage 20 extends through each of the distributor blocks 18 so that when the latter are mounted in the core 10 the passages 20 and 12 are coaxial. Passages 20 are of substantially circular cross section throughout their respective lengths but of non-uniform diameter so that each passage has a portion 22 of minimum diameter and a counterbored portion 24 of larger diameter. In addition, the portions 24 are outwardly tapered as indicated at 26 to receive with a tight fit the reduced end portions 28 of a bearing element 30, which may be in the form of a tube or sleeve.

Element 30 is formed of some suitable bearing material such as bronze or babbitt, and is preferably non-porous. The inside diameters of the corresponding tapered end portions of the bearing tube are less than the inside diameter of the main body portion of the tube, the inner surfaces 32 of these end portions providing bearing surfaces for a rotatable motor shaft 34. The larger inside diameter of the main body portion of the tube 30 provides an annular space 35 between it and shaft 34 for a purpose hereinafter explained.

The single, unitary bearing element 30 permits more accurate bearing alignment than is ordinarily possible with the usual multiple bearing elements, and retains this more accurate alignment over a longer period of time. Thus, when element 30 is properly formed, the bearing surfaces 32 are in perfect alignment and there is no possibility of destroying this perfect alignment by a subsequent shift in position of the bearing surfaces or other motor parts. Maintenance of proper bearing alignment is of course essential in providing the necessary film thickness of the lubricant along the full length of the bearing surfaces. If the bearing surfaces are not accurately aligned when assembled or after assembly are moved slightly out of alignment, the film thickness of the lubricant may be destroyed in a portion of the bearing so that the bearing will wear at this point. This permits the shaft to become loose in its bearings and to become noisy. By providing the unitary bearing element 30 in accordance with the present invention, the bearing surfaces may be more readily and accurately aligned when the motor is assembled and, moreover, cannot move out of alignment afterward, thereby ensuring uniformly quiet and efficient motor operation. This, of course, is difficult, if not impossible to accomplish, with the required degree of accuracy, where a motor shaft has separate bearings at each end and where each bearing must be mounted with great care during assembly or may shift out of alignment once assembled. Since the effectiveness of bearing lubrication is directly related to bearing alignment, it will be apparent to those familiar with the art that the superior bearing alignment provided by element 30 is an important factor in obtaining proper lubrication over a long period of time.

The bearing surfaces 32, of course, can be of greater or less area than is shown for the purpose of illustration, the extent of the bearing surfaces being determined, among other things, by the load on the motor and the application of the latter.

The core 10, distributor blocks 18 and bearing element 30 define an enclosed annular chamber 36 which serves as the storage space for the lubricant supply. A fabric wick 38 of some material such as felt is positioned in the chamber 36, the wick being of such size and shape that it substantially fills the chamber without being compressed by the chamber walls. Thus, the wick 38 may just touch the inner faces of distributor blocks 18 or may be spaced slightly therefrom. However, the clearance between wick 38 and the distributor blocks must not be so large as to destroy the transfer of lubricant from the wick to the porous distributor blocks. When the wick 38 is initially inserted in chamber 36 it is saturated with oil, grease or other suitable lubricant in sufficient amount to provide continuous motor lubrication over a long period of time. Chamber 36 is substantially airtight except for a single passage 40 through the sidewall of bearing element 30 which connects the chamber with the annular space 35 between element 30 and shaft 34, and therefore with the ambient atmosphere as will be explained.

The bearing element or sleeve 30, as shown in Fig. 3, may be formed from bronze tubing which is cut to the right length, the inside and outside diameters of the ends of the cut section being reduced in a die to form the end portions 28. When the element is formed in this manner, it must be machined within close tolerances, after it has been assembled in the motor, to the proper inside diameter of the bearing surfaces 32. However, instead of forming the element 30 from bronze tubing, certain advantages can be obtained by using a bearing metal such as babbitt which can be die cast into tubular elements of the proper length, and by reducing the end portions of these die cast elements in the same manner as described above. The various parts of the bearing unit are then assembled in the motor by means of a hand or power driven press in the manner shown in Fig. 5, in which a motor, indicated generally at 60, is depicted with its bearing parts in position ready for final assembly. The assembly press consists of a standard die set having a stationary platform 62 and a vertically movable upper member 63.

A die 64 is spring loaded for vertical reciprocating movement within housing 66 which rests on platform 62, compression spring 67 being provided to urge die 64 upwardly. Die 64 is hollow for the reception of a punch 68 in its lower portion. Punch 68 is fixed at its base in platform 62 as indicated and has a circular cross-section substantially equal to the outside diameter of a distributor block 18 of the bearing unit described hereinbefore. The inside diameter of the upper end of die 64 is slightly larger than punch 68 and is adapted to receive a distributor block 18 and to hold one end of core 10 of the motor 60.

A shaft 70, having a diameter equal to the shaft of the motor, is secured centrally within punch 68 for ensuring accurate alignment of the bearing parts during the final assembly operation. One distributor block 18 is first placed, with the tapered portion 26 of its passage 20 facing upward, on shaft 70 and allowed to nest within the hollow upper portion of die 64, one end of bearing element 30 having been inserted part way into the tapered portion 26 of passage 20 within block 18. A ring of wick 38, which has been saturated with the proper lubricant, is placed around element 30, and then core 10 of motor 60 placed in position around this. Finally, the opposite distributor block 18 is placed face down on shaft 70 which is long enough to project well above the core 10 as shown in Fig. 5.

An upper punch 72 is mounted on the upper movable member 63 of the press and is adapted to receive the upper end of shaft 70 within its centrally located passage 74 as shown. It is readily apparent from the foregoing that movement of the upper punch 72 downward will press the distributor blocks 18 toward each other within the core 10 of the motor for proper positioning of the bearing parts therein. Upper punch 72 is provided with a projection 76 on its lower face which will fit a predetermined distance within core 10 so that the distributor block 18 at this end of the motor will be pressed slightly within the core 10.

Thus, when the upper punch 72 is lowered, the die 64 is moved downwardly against the compression of spring 67 until the lower end of the die strikes the base of punch 68. Punch 68, which remains stationary, forces the lower distributor block 18 (as seen in Fig. 5) into the core 10 of the motor, while at the same time, the upper punch 72 forces the upper block 18 downwardly until the outer portion of punch 72 abuts the end of core 10. This locates the distributor blocks in the proper spaced relation within core 10 and seats the ends of bearing element 30 within the portions 24 of the distributor blocks 18. It should be noted here that if the wick 38 is too long, it will become squeezed between the distributor blocks during assembly, forcing the lubricant out of the wick and causing leakage. It is, therefore, important that the wick be the right size so that it just fills the space between the distributor blocks without being compressed when the unit is assembled. The upper punch is then raised above spindle 70 and may be provided with means (not shown) for lifting the motor with it. After the bearing unit is fully assembled in the motor the bearing surfaces are machined to size and the motor is then provided with a shaft and other related parts in the usual manner.

Figure 6:
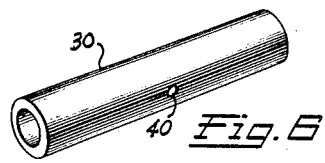
Fig. 6 is a perspective view of a bearing element before being assembled in the motor in accordance with the novel method of assembly.

Whereas the foregoing description of the assembly of the bearing unit assumes that the reduced end portions 28 of bearing element 30 are provided in this element prior to assembly, it will be noted that the bearing element shown in Fig. 5 is not provided with reduced end portions before it is assembled. Thus, by using certain bearing metals such as babbitt containing 75 to 80% lead, it has been found that a straight tubular sleeve as shown in Fig. 6, having an inside diameter equal to the inside diameter of the central portion of the element 30 as it appears in Fig. 1, may be used instead of forming the reduced end portions 28 prior to assembly. Thus, when the tubular element 30 of Fig. 5 is pressed into tapered portions 26 of counterbore 24 of the distributor blocks, the metal at its ends is compressed around the spindle 70, thereby forming the reduced end portions of element 30 during the actual assembly of the bearing. Since babbitt forms an excellent bearing surface by merely running-in the bearing, the bearing surfaces at 32 formed by this method do not necessarily have to be machined after the bearing unit is assembled. However, where the novel method of assembly just described is used, an assembling shaft having a diameter, which is slightly larger than the diameter of the motor shaft, should be used in order to provide the proper bearing clearance in the motor.

It will be readily seen that the novel method of forming the bearing surfaces during the assembly of the bearing unit saves production costs by reducing the initial cost of the bearing element and by eliminating at least one step in the assembly of the unit. Furthermore, since the bearing surfaces 32 of element 30 are formed substantially simultaneously by compressing the ends of element 30 around the shaft 70 as the distributor blocks 18 are pressed inwardly during assembly, the bearings become perfectly aligned, and any possibility of misalignment is virtually eliminated.

The flow of lubricant in the hereinbefore described bearing unit is substantially as follows: Since the lubricant saturated wick 38 touches or is a few thousandths of an inch from porous lubricant distributor blocks 18, which may if desired be impregnated with lubricant before they are assembled, minute quantities of the lubricant are drawn from the wick into and through each block by capillary action following paths substantially as indicated by the arrows 44. The surfaces 22 of the blocks 18 do not contact the shaft 34 but are closely enough associated with the shaft to permit the lubricant to flow onto it from the distributor blocks and to form an annular space through which the lubricant may travel toward the bearing surfaces 32 of bearing element 30 as will be described hereinafter. The annular space adjacent the distributor blocks communicates with the minute space or clearance between the bearing surfaces 32 and the shaft 34 so that there is a continuous path from the wick 38 to the bearing surfaces along which the lubricant travels. The fact that clearance between the bearing surfaces is thinner than the space between the shaft and surfaces 22 is one reason why the lubricant tends to travel inwardly to the bearing surfaces from the distributor blocks rather than outwardly. The rate of lubricant travel along the shaft is controlled in part by the amount of lubricant in the bearing at any given time or, in other words, by the rate of dissipation of the lubricant at the bearing surfaces due to heat and other factors. Since the shaft 34 rotates during motor operation, the spreading of an unbroken lubricant film over the shaft, and particularly the bearing surfaces, is aided by shaft action as is indicated schematically by the arrows 46.

While some of the lubricant may travel outwardly or away from the bearing surfaces after reaching surfaces 22, the amount of such lubricant and its distance of travel is negligible since the stored lubricant is not under pressure and since capillarity is destroyed by an open space. For the same reason, no substantial amount of lubricant passes through the outer surfaces 48 of distributor blocks 18 since substantially the only point at which the lubricant is being removed from the blocks is at the surfaces 22 where it is fed to the bearing surfaces. In this connection, however, it is important to note that the reason wick 38 must not be compressed by the walls of chamber 36 is that if it were so compressed by being tightly packed into the chamber, the lubricant might flow out of the chamber too rapidly and be forced outwardly along the shaft where it would be wasted and could very easily create a highly undesirable condition.

If the lubricant storage chamber 36 were completely airtight, a partial vacuum would develop therein as the lubricant is drawn from the chamber into the distributor blocks 18. In time this vacuum would prevent the further flow of lubricant from the chamber, and the bearing surfaces would run dry to the detriment of the motor operation. It is to prevent such an occurrence that the passage 40 in bearing element 30 is provided since this passage serves as an inlet or vent so that air or any lubricant which may have accumulated in space 35 can replace the lubricant that has passed from the chamber 36, and thereby enable the entire lubricant supply to be utilized. Air may reach the passage 40 by way of the minute clearance between the bearing surfaces 32 and shaft 34, and from thence along the annular space 35 as is schematically indicated by arrows 50. Obviously, the amount of air passing into the lubricating system at any given time is almost negligible, but it is sufficient to occupy the space therein vacated by the minute quantities of lubricant which become used up. Furthermore, some of the lubricant accumulates in the space 35 and may be drawn back into the storage chamber 36 through passage 40, making a complete cycle. As has been noted hereinbefore, if no vent were provided, the lubricant would soon cease to flow out of the storage chamber. On the other hand, if too large a vent were provided, as has been the case in many prior devices, there would be undue leakage of lubricant and the supply would be quickly exhausted. In either case, continuous lubrication over a long period of time would be impossible.

As mentioned above, the rate of feed of the lubricant along the passages surrounding shaft 34 is dependent to a large extent upon the amount of lubricant used or dissipated at the bearing surfaces. This in turn depends upon such factors as the speed of shaft rotation and the temperature within the motor. Accordingly, it is desirable to have a lubrication arrangement that can be adapted for use with motors of varying characteristics, or, in other words, an arrangement that can be made to deliver lubricant at a rate that is commensurate with the requirements of the motor in which it is to be used. The lubrication arrangement can be so adapted by selectively varying the characteristics of the lubricant distributor blocks 18, by varying the viscosity of the stored lubricant itself and by varying the size of the vent 40. Thus, if it be known what the application and location of a given motor will be, lubricant distributor blocks 18 can be selected for that motor, which will permit a stored lubricant of the proper viscosity to feed to the motor bearing surfaces at the correct rate.

There are four important ways of controlling the characteristics of lubricant distributor blocks 18 during the formation thereof so that the blocks can be made to deliver lubricant at a desired rate to the capillary passage and motor bearing surfaces. Thus, the characteristics of the blocks may be controlled by varying the material used to make up the blocks, the percentage of porosity of the material selected, the amount of clearance between surfaces 22 and shaft 34, and the total area of surfaces 22. Any of a number of different porous materials may be used so long as the material selected is sufficiently rigid to securely hold bearing element 30. In addition, it is now possible to control the percentage of porosity in most porous materials within a relatively wide range. It should be pointed out, moreover, that since the porous distributor blocks 18 do not serve as bearings, the axial length of surfaces 22 need not be controlled by bearing loads but can be determined solely by lubrication requirements.

A typical small electric clock motor designed to operate at 450 R. P. M. at 60 cycles and at a temperature approximately 50° F. above ambient temperature has a shaft about one inch long over-all. In a specific example according to the present invention, the shaft for a motor of the foregoing type is desirably .069 inch in diameter and the bearing element 30 is about a half inch long. The bearing surfaces 32 of element 30 in this particular case are each .05 inch in length measured axially of the shaft and have a total clearance between the shaft and the bearing surface of about .0004 to .0005 inch. The axial length of each of the surfaces 22 of the distributor blocks is about .045 to .05 inch while the total clearance between the shaft and the distributor at this point is about .0009 to .0010 inch or substantially twice the clearance in the bearings. It has been found that in the particular structure under consideration a vent passage 40 having a diameter of about .020 is especially suitable. A particularly desirable material for the distributor blocks in motors of the foregoing type has been found to be a sintered metal of compressed bronze powder, consisting of 87.5 to 90.5 percent copper and 9.5 to 10.5 percent tin, and having a porosity of about 28 percent by volume. The foregoing example is of course illustrative only, since other dimensions and materials, as well as various combinations thereof, can be used depending on the circumstances.

Having formed the lubricant distributor blocks and the bearing element to substantially meet the lubrication requirements of a given motor, the length of time that the bearings will be properly lubricated can be further controlled by selectively varying the viscosity and other characteristics of the stored lubricant with which wick 38 is saturated. A lubricant found to be especially desirable for this purpose is a silicone fluid such as Dow Corning 550, which has a viscosity of 150 SSU at 77° F.

From the foregoing description it will be apparent that an important part of the present invention is the provision of a novel bearing arrangement by which the motor bearings are self-lubricated for a greater length of time than has been possible before and therefore enables quieter, more efficient motor operation and reduced wear on the motor parts. In addition, the bearing arrangement herein disclosed is adaptable to any type of motor since the unitary bearing element may be constructed to withstand any desired load.

What is claimed is:

1. In a bearing lubrication unit, a rotatable shaft, a bearing sleeve having bearing surfaces rotatably supporting said shaft, a pair of porous lubricant distributor blocks supporting said sleeve and having passages through which said shaft passes, said passages being of slightly larger diameter than the diameter of said shaft so that there are clearance spaces therebetween, and support means for said blocks; said support means, blocks and sleeve defining an enclosed lubricant storage chamber, whereby a lubricant stored in said chamber will pass through said porous blocks to said clearance spaces and from thence to the bearing surfaces of said sleeve.

2. The combination as defined in claim 1, wherein said bearing sleeve has a passage through the wall thereof in communication with said chamber.

3. In a self-lubricating bearing, a pair of porous lubrication distributor members, means to support said members in spaced relation to one another, a single bearing element supported between said members and having bearing surfaces for a rotatable shaft, said members and element having a continuous axial passage therethrough, and a shaft in said passage having a running fit with the bearing surfaces of said bearing element and a looser fit with said distributor members, the spaces between said members and said shaft and between said element and said shaft forming capillary passages for the delivery of a lubricant to the bearing surfaces of said element; said means, members and element defining a lubricant storage chamber, whereby a lubricant stored in said chamber will pass by capillary action through said porous members to said capillary passages.

4. In a self-lubricating bearing, a pair of porous lubrication distributor members, means to support said members in spaced relation to one another, a single bearing tube supported by and between said members and having bearing surfaces for a rotatable shaft provided by portions of reduced diameter adjacent its ends, said distributor members having passages therethrough coaxial with said bearing tube, and a rotatable shaft positioned in the passages of said distributor members and in said bearing tube, said shaft having a bearing fit with the bearing portions of said tube and a looser fit within the passages of said distributor members, the spaces between said distributor members and shaft forming capillary passages for the delivery of a lubricant to the bearing surfaces of said tube; said support means, distributor members and tube defining an enclosed annular lubricant storage chamber, whereby a lubricant stored in said chamber will pass by capillary action through said porous members to said capillary passages.

5. The combination as defined in claim 4, wherein said bearing tube has a passage through the wall thereof in communication with said chamber.

6. The combination as defined in claim 4 which further includes an annular lubricant-saturated wick positioned in said chamber.

7. In a self-lubricating bearing, a rotatable shaft, a non-porous bearing tube having corresponding portions of reduced inner diameter adjacent its ends, the inner surfaces of said portions forming bearing surfaces for supporting said shaft in a bearing fit, a pair of porous lubricant distributor blocks supporting said tube and having passages through which said shaft passes with a loose fit so that the spaces between said blocks and shaft form capillary passages for the delivery of a lubricant to the bearing surfaces of said tube, and non-porous support means for said lubricant distributor blocks; said support means, blocks and tube defining an enclosed annular lubricant storage chamber whereby a lubricant stored in said chamber will pass by capillary action through said porous blocks to said capillary passages.

8. The combination as defined in claim 7, wherein said bearing tube has a passage through the wall thereof intermediate its reduced diameter portions, which passage is in communication with said chamber.

9. The combination as defined in claim 7 which further includes an annular lubricant saturated wick positioned in said chamber so as to be substantially in contact with said distributor blocks.

10. In a self-lubricating bearing, a support member having a longitudinal passage therethrough, porous lubrication distributor blocks mounted in said passage adjacent each end thereof, each of said blocks having a passage therethrough coaxial with the passage of said support member, a bearing tube supported by said blocks, the ends of said tube each extending into a portion of the passage through one of said blocks, a rotatable shaft extending through said tube and block passages and having a bearing clearance in the tube and a slightly greater clearance in said blocks, said support member, blocks and tube defining an enclosed lubricant storage chamber, and a wick positioned in said chamber substantially in contact with said lubricant distributor blocks, said wick being saturated with a lubricant whereby said lubricant will pass by capillary action through said porous blocks to the clearance between said blocks and shaft and from thence to the bearing surfaces of said shaft and tube.

11. In a self-lubricating bearing, a rigid porous lubricant distributor block having a passage therethrough, a rotatable shaft extending through said passage, means to support said porous block, said passage being of a slightly larger diameter than the diameter of said shaft to form an annular clearance space between said shaft and said porous block, bearing means having bearing surfaces adjacent said block to support said shaft, the bearing surfaces of said bearing means being in communication with the clearance space between said shaft and porous block, and a lubricant source in contact with said porous block and communicating with the bearing surfaces through said block and clearance space.

References Cited in the file of this patent

UNITED STATES PATENTS

| | | |
|---|---|---|
| 1,935,208 | Haydon | Nov. 14, 1933 |
| 2,195,749 | Lignian | Apr. 2, 1940 |
| 2,306,743 | Morrill | Dec. 29, 1942 |
| 2,540,688 | Novy | Feb. 2, 1951 |
| 2,612,417 | White | Sept. 30, 1952 |
| 2,615,069 | Gallagher | Oct. 21, 1952 |
| 2,625,452 | Haller | Jan. 13, 1953 |
| 2,696,410 | Topanelian, Jr. | Dec. 7, 1954 |